(12) United States Patent
Gorman

(10) Patent No.: US 7,525,959 B2
(45) Date of Patent: Apr. 28, 2009

(54) SYSTEM AND METHOD FOR DISTRIBUTING VOICE AND DATA INFORMATION OVER WIRELESS AND WIRELINE NETWORKS

(75) Inventor: Michael George Gorman, Schaumburg, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 508 days.

(21) Appl. No.: 11/112,840

(22) Filed: Apr. 22, 2005

(65) Prior Publication Data

US 2005/0271080 A1  Dec. 8, 2005

Related U.S. Application Data

(63) Continuation of application No. 09/679,091, filed on Oct. 4, 2000, now Pat. No. 6,917,624, which is a continuation of application No. 08/966,926, filed on Nov. 10, 1997, now Pat. No. 6,141,356.

(51) Int. Cl.
  *H04L 12/56* (2006.01)
  *H04Q 11/02* (2006.01)
(52) U.S. Cl. ..................... 370/386; 370/329
(58) Field of Classification Search ......... 370/328, 370/329, 386, 442, 535, 352; 455/426
See application file for complete search history.

(56) References Cited

U.S. PATENT DOCUMENTS

| | | | |
|---|---|---|---|
| 3,649,761 A | 3/1972 | Bush et al. | |
| 3,711,648 A | 1/1973 | Whitney | |
| 3,898,390 A | 8/1975 | Wells | |
| 3,922,491 A | 11/1975 | Bjork et al. | |
| 3,999,006 A | 12/1976 | Takeuchi et al. | |
| 4,430,731 A | 2/1984 | Gimple et al. | |
| 4,449,218 A | 5/1984 | Strehl | |
| 4,512,013 A | 4/1985 | Nash et al. | |
| 4,650,930 A | 3/1987 | Hogeboom et al. | |
| 4,654,866 A | 3/1987 | Bottle et al. | |
| 4,670,874 A | 6/1987 | Sato et al. | |
| 4,740,955 A | 4/1988 | Litterer et al. | |

(Continued)

FOREIGN PATENT DOCUMENTS

EP  0 659 007 A2  6/1995

(Continued)

OTHER PUBLICATIONS

Waldfogel, Asher, "New Box Opens Doors For CLECs".

(Continued)

*Primary Examiner*—John Pezzlo
(74) *Attorney, Agent, or Firm*—Brinks Hofer Gilson & Lione

(57) ABSTRACT

A method and device for distributing both high-speed data service, such as digital computer, video and multimedia data, and lower speed data service, such as POTS voice telephone signals, throughout a customer premises. High-speed digital data and lower speed POTS voice signals are separated by a POTS splitter and distributed throughout the customer premises on separate distribution networks. The lower speed POTS is carried on a wireless distribution network and the high-speed data carried on the existing customer premises wiring ordinarily used for POTS.

7 Claims, 4 Drawing Sheets

U.S. PATENT DOCUMENTS

| | | | |
|---|---|---|---|
| 4,769,833 A | 9/1988 | Farleigh et al. |
| 4,776,005 A | 10/1988 | Petriccione et al. |
| 4,901,342 A | 2/1990 | Jones |
| 5,042,062 A | 8/1991 | Lee et al. |
| 5,054,055 A | 10/1991 | Hanle et al. |
| 5,109,406 A | 4/1992 | Mano et al. |
| 5,127,041 A | 6/1992 | O'Sullivan |
| 5,184,345 A | 2/1993 | Sahni |
| 5,214,650 A | 5/1993 | Ranner et al. |
| 5,220,599 A | 6/1993 | Sasano et al. |
| 5,291,479 A | 3/1994 | Vaziri et al. |
| 5,305,312 A | 4/1994 | Fornek et al. |
| 5,317,630 A | 5/1994 | Feinberg et al. |
| 5,329,308 A | 7/1994 | Binns et al. |
| 5,349,638 A | 9/1994 | Pitroda et al. |
| 5,353,334 A | 10/1994 | O'Sullivan |
| 5,410,343 A | 4/1995 | Coddington |
| 5,425,090 A | 6/1995 | Orriss |
| 5,428,608 A | 6/1995 | Freeman et al. |
| 5,430,719 A | 7/1995 | Weisser, Jr. |
| 5,438,568 A | 8/1995 | Weisser, Jr. |
| 5,440,585 A | 8/1995 | Partridge, III |
| 5,448,555 A | 9/1995 | Bremer et al. |
| 5,448,635 A | 9/1995 | Blehl et al. |
| 5,453,984 A | 9/1995 | Mueller |
| 5,459,730 A | 10/1995 | Bliven |
| 5,463,616 A | 10/1995 | Kruse et al. |
| 5,467,385 A | 11/1995 | Reuben et al. |
| 5,469,496 A | 11/1995 | Emery et al. |
| 5,473,613 A | 12/1995 | Bliven |
| 5,475,735 A | 12/1995 | Williams et al. |
| 5,479,491 A | 12/1995 | Garcia et al. |
| 5,479,495 A | 12/1995 | Blumhardt |
| 5,499,290 A | 3/1996 | Koster |
| 5,502,760 A | 3/1996 | Gilbert et al. |
| 5,506,866 A | 4/1996 | Bremer et al. |
| 5,511,075 A | 4/1996 | Bhasker |
| 5,511,109 A | 4/1996 | Hartley et al. |
| 5,517,562 A | 5/1996 | McConnell |
| 5,519,731 A | 5/1996 | Cioffi |
| 5,519,763 A | 5/1996 | Namekawa et al. |
| 5,519,772 A | 5/1996 | Akman et al. |
| 5,524,047 A | 6/1996 | Brown et al. |
| 5,526,413 A | 6/1996 | Cheston, III et al. |
| 5,528,281 A | 6/1996 | Grady et al. |
| 5,528,285 A | 6/1996 | Morikawa et al. |
| 5,528,666 A | 6/1996 | Weigand et al. |
| 5,533,019 A | 7/1996 | Jayapalan |
| 5,533,105 A | 7/1996 | Brown et al. |
| 5,535,204 A | 7/1996 | Li |
| 5,537,436 A | 7/1996 | Bottoms et al. |
| 5,544,164 A | 8/1996 | Baran |
| 5,546,447 A | 8/1996 | Skarbo et al. |
| 5,550,649 A | 8/1996 | Wong et al. |
| 5,555,258 A | 9/1996 | Snelling et al. |
| 5,563,938 A | 10/1996 | Soshea |
| 5,566,235 A | 10/1996 | Hetz |
| 5,572,572 A | 11/1996 | Kawan et al. |
| 5,572,583 A | 11/1996 | Wheeler, Jr. et al. |
| 5,592,538 A | 1/1997 | Kosowsky et al. |
| 5,598,456 A | 1/1997 | Feinberg |
| 5,602,837 A | 2/1997 | Takahashi |
| 5,603,095 A | 2/1997 | Uola |
| 5,610,910 A | 3/1997 | Focsaneanu et al. |
| 5,610,972 A | 3/1997 | Emery et al. |
| 5,613,190 A | 3/1997 | Hylton |
| 5,613,191 A | 3/1997 | Hylton et al. |
| 5,617,450 A | 4/1997 | Kakuishi et al. |
| 5,630,204 A | 5/1997 | Hylton et al. |
| 5,636,266 A | 6/1997 | Ranganath et al. |
| 5,640,444 A | 6/1997 | O'Sullivan |
| 5,644,629 A | 7/1997 | Chow |
| 5,664,003 A | 9/1997 | Foladare et al. |
| 5,666,487 A | 9/1997 | Goodman et al. |
| 5,668,857 A | 9/1997 | McHale |
| 5,708,961 A | 1/1998 | Hylton et al. |
| 5,751,707 A | 5/1998 | Voit et al. |
| 5,761,292 A | 6/1998 | Wagner |
| 5,768,280 A | 6/1998 | Way |
| 5,790,548 A | 8/1998 | Sistanizadeh et al. |
| 5,793,498 A | 8/1998 | Scholl et al. |
| 5,796,729 A | 8/1998 | Greaney et al. |
| 5,822,324 A | 10/1998 | Kostresti et al. |
| 5,825,777 A | 10/1998 | Komarek et al. |
| 5,828,666 A | 10/1998 | Focsaneanu et al. |
| 5,842,111 A | 11/1998 | Byers |
| 5,854,829 A | 12/1998 | Hughes-Hartogs |
| 5,862,202 A | 1/1999 | Bashoura et al. |
| 5,864,763 A | 1/1999 | Leung et al. |
| 5,878,078 A | 3/1999 | Griffin et al. |
| 5,889,774 A | 3/1999 | Mirashrafi et al. |
| 5,889,856 A | 3/1999 | O'Toole et al. |
| 5,892,591 A | 4/1999 | Anglin, Jr. et al. |
| 5,892,764 A | 4/1999 | Riemann et al. |
| 5,905,781 A | 5/1999 | McHale et al. |
| 5,910,970 A | 6/1999 | Lu |
| 5,930,250 A | 7/1999 | Klok et al. |
| 5,937,040 A | 8/1999 | Wrede et al. |
| 5,943,404 A | 8/1999 | Sansom et al. |
| 5,949,763 A | 9/1999 | Lund |
| 5,954,799 A | 9/1999 | Goheen et al. |
| 5,970,069 A | 10/1999 | Kumar et al. |
| 5,991,292 A | 11/1999 | Focsaneanu et al. |
| 6,005,677 A | 12/1999 | Suzuki |
| 6,005,873 A | 12/1999 | Amit |
| 6,020,915 A | 2/2000 | Bruno et al. |
| 6,028,867 A | 2/2000 | Rawson et al. |
| 6,028,917 A | 2/2000 | Creamer et al. |
| 6,044,107 A | 3/2000 | Gatherer et al. |
| 6,044,403 A | 3/2000 | Gerszberg et al. |
| 6,049,531 A | 4/2000 | Roy |
| 6,064,667 A | 5/2000 | Gisby et al. |
| 6,069,879 A | 5/2000 | Chatter |
| 6,075,784 A | 6/2000 | Frankel et al. |
| 6,078,582 A | 6/2000 | Curry et al. |
| 6,081,517 A | 6/2000 | Liu et al. |
| 6,084,881 A | 7/2000 | Fosmark et al. |
| 6,130,893 A | 10/2000 | Whittaker et al. |
| 6,141,339 A | 10/2000 | Kaplan et al. |
| 6,141,356 A | 10/2000 | Gorman |
| 6,157,635 A | 12/2000 | Wang et al. |
| 6,233,234 B1 | 5/2001 | Curry et al. |
| 6,243,577 B1 * | 6/2001 | Elrefaie et al. ............ 455/426.2 |
| 6,282,189 B1 | 8/2001 | Eames |
| 6,285,671 B1 | 9/2001 | Bossemeyer, Jr. et al. |
| 6,335,936 B1 | 1/2002 | Bossemeyer, Jr. et al. |
| 6,349,096 B1 | 2/2002 | Liu et al. |
| 6,349,224 B1 | 2/2002 | Lim |
| 6,370,137 B1 | 4/2002 | Lund |
| 6,370,149 B1 | 4/2002 | Gorman et al. |
| 6,389,011 B2 | 5/2002 | Allen et al. |
| 6,480,487 B1 | 11/2002 | Wegleitner et al. |
| 2002/0021691 A1 | 2/2002 | Bossemeyer, Jr. et al. |

FOREIGN PATENT DOCUMENTS

| | | |
|---|---|---|
| EP | 0 659 007 A3 | 6/1995 |
| EP | 0 684 714 A2 | 11/1995 |
| EP | 0 740 451 A1 | 10/1996 |
| EP | 0 783 217 A2 | 7/1997 |
| WO | WO 96/29814 | 9/1996 |
| WO | WO 96/38018 | 11/1996 |
| WO | WO 97/23078 | 6/1997 |
| WO | WO 98/20702 | 5/1998 |

| WO | WO 99/53654 | 10/1999 |
| WO | WO 99/65179 | 12/1999 |
| WO | WO 00/65777 | 11/2000 |
| WO | WO 00/65778 | 11/2000 |

OTHER PUBLICATIONS

Schoen et al., "Convergence between public switching and the Internet", IEEE Communications Magazine, vol. 36, Issue 1, Jan. 1998, pp. 50-65.

"Requirements for Local Loop Emulation using AAL2 over xDSL", *ATM Forum*, Jul. 26, 1999.

"Design Principles Behind a Practical Implementation of Local Loop Emulation using AAL2", *ATM Forum*, Jul. 26, 1999.

"Loop Emulation Service and New Profile Definition for Voice Over AAL2", *ATM Forum*, Jul. 26, 1999.

European Examination Report for Application No. 98 957 397.7—2413 dated Jul. 20, 2004.

Claims for U.S. Appl. No. 09/533,263 entitled "Telecommunication System, Method and Subscriber Unite For Use Therein", filed Mar. 17, 2000.

Claims for U.S. Appl. No. 09/863,064 entitled "Method and System for Providing Facsimile Service Over A Digital Subscriber Line" filed May 21, 2001.

Peter S. Chow and John M. Cioffi, "A Multi-Drop In-House ADSL Distribution Network", produced for conference in New Orleans, May 1-5, 1994, Serving Humanity Through Communications, IEEE, dated May 1994, pp. 456-460.

\* cited by examiner

SYSTEM AND METHOD FOR DISTRIBUTING VOICE AND DATA INFORMATION OVER WIRELESS AND WIRELINE NETWORKS

CROSS-REFERENCE TO RELATED APPLICATIONS

This application is a continuation of U.S. application Ser. No. 09/679,091, filed Oct. 4, 2000, now U.S. Pat. No. 6,917,624, which is a continuation of U.S. application Ser. No. 08/966,926, filed Nov. 10, 1997, now U.S. Pat. No. 6,141,356, wherein the entirety of each is hereby incorporated by reference.

BACKGROUND OF THE INVENTION

A. Field of the Invention

The present invention relates to a method and device for distributing high-speed digital data information and lower speed data including Plain Old Telephone Service ("POTS") voice signals throughout a customer premises.

B. Description of the Related Art

The Internet is a worldwide interconnection of computers that offers a vast array of multimedia audio, video, graphics, and text information accessible from a user's home computer. The available multimedia content on the Internet requires millions of bits of digital data to be transmitted or downloaded to the user's computer. Conventional voice-band data modems used to access the Internet, however, use a serial telephone line connection transmitting data at less than 56 kilobits per second. The user's ability to quickly obtain and view information using a conventional telephone line connection is thus substantially limited.

The desire to bring large amounts of multimedia digital data from the Internet into the home has increased the demand for high-speed data services such as Integrated Digital Services Network ("ISDN") and Digital Subscriber Lines ("DSL") to the home or small business office. In addition to Plain Old Telephone Service ("POTS"), telephone operating companies are now offering these high-speed data services to bring digital data from the telephone company central office to the telephone subscriber's home or office. High-speed data and POTS are often carried to the home at different frequencies on the same physical wire pair.

Once to the telephone subscriber's home, these high-speed data services must be distributed throughout the home or office to the locations where computer users are located. Existing homes typically do not have wiring facilities to distribute high-speed data. At a typical customer premises, such as the family home, the telephone company delivers conventional POTS and high-speed data services to a network interface device ("NID") located outside of the building. From the NID, a pair of conductive telephone wires delivers POTS to the rooms in the home where telephones are located. To distribute high-speed data services in addition to supplying POTS, however, additional wiring must ordinarily be installed throughout the customer premises. Installing additional wiring to each desired location throughout the premises, however, can be expensive and disruptive to those living or working there.

To avoid the cost and disruption of installing new wiring, wireless data distribution systems have been proposed to distribute high-speed digital data throughout the customer premises location without such disruption or installation costs. Wireless distribution systems, however, typically have less bandwidth capacity than a wireline system. Wireless distribution systems may also create or be susceptible to interference with other electronic devices that are commonly found in an office environment. Thus, higher performance wireless systems that are less susceptible to interference and have higher bandwidth capacity are more complex and considerably more expensive than a wireline distribution system. Additionally, high-speed data terminals are typically placed at a fixed location, whereas voice and portable low-speed data terminals would often benefit from mobility in and near the customer premises.

In accordance with an illustrative embodiment of the present invention, the problems of distributing both high-speed data and POTS signals throughout a customer premises can be addressed without the cost and disruption of installing new wiring or cost and complexity of wireless data networks.

BRIEF DESCRIPTION OF THE DRAWINGS

The foregoing and other objects, features and advantages of the present invention will be more readily appreciated upon reference to the following disclosure when considered in conjunction with the accompanying drawings, in which.

DETAILED DESCRIPTION OF THE PREFERRED EMBODIMENT

While the invention is described below in some detail with reference to certain illustrated embodiments, it is to be understood that it is not limited to those embodiments. On the contrary, the intent is to cover all modifications, alternatives and equivalents falling within the spirit and scope of the invention as defined by the appended claims.

The present embodiment provides an information distribution system within a customer premises location using a wireline distribution network for distributing high-speed data and a separate wireless distribution network for distributing POTS and lower speed data. The customer premises location receives high-speed digital data such as computer, video, multimedia data containing audio, graphics, and text, and lower speed data including POTS voice band frequencies from the public switched telephone network ("PSTN"). The PSTN includes those public switched telephone networks provided by AT&T, Regional Bell Operating Companies (e.g., Ameritech, U.S. West, Bell Atlantic, SBC, Bell South, NYNEX, and Pacific Telesis Group) and others. A POTS splitter separates the high-speed digital data from the lower speed POTS signals. Lower speed POTS signals are distributed throughout the customer premises on the wireless distribution system rather than the existing wireline distribution system. The wireless system may also have multiple channels to provide additional POTS lines and distribute lower speed data. The wireline distribution network can then be used to distribute the high-speed digital data throughout the customer premises.

The present embodiment provides the distribution of high-speed data and lower speed POTS signals on separate wireless and wireline network distribution facilities to avoid the cost and disruption of installing additional wiring at the customer premises. The wireless distribution system carries lower speed data and has relatively lower bandwidth requirements, reducing the complexity and cost of the wireless distribution system. The wireless distribution system also provides cordless operation allowing users to access the telephone in different areas throughout the customer premises and freely move about while speaking on the telephone. The existing telephone wiring is free from carrying POTS and can be utilized to carry high-speed data typically associated with digital computer data or multimedia information. Using the wireline distribution network, the high-speed data is available at outlets throughout the customer premises for connection to computers, computer peripherals, and video display devices.

The present embodiment also provides for the distribution of POTS signals and lower speed data over the existing wireline system in the event of a power failure or outage. During a loss of power, the wireless distribution network is typically out of service. Lower speed POTS is thus switched over to the wireline distribution network to provide service in the event of a power failure.

Figure 1:
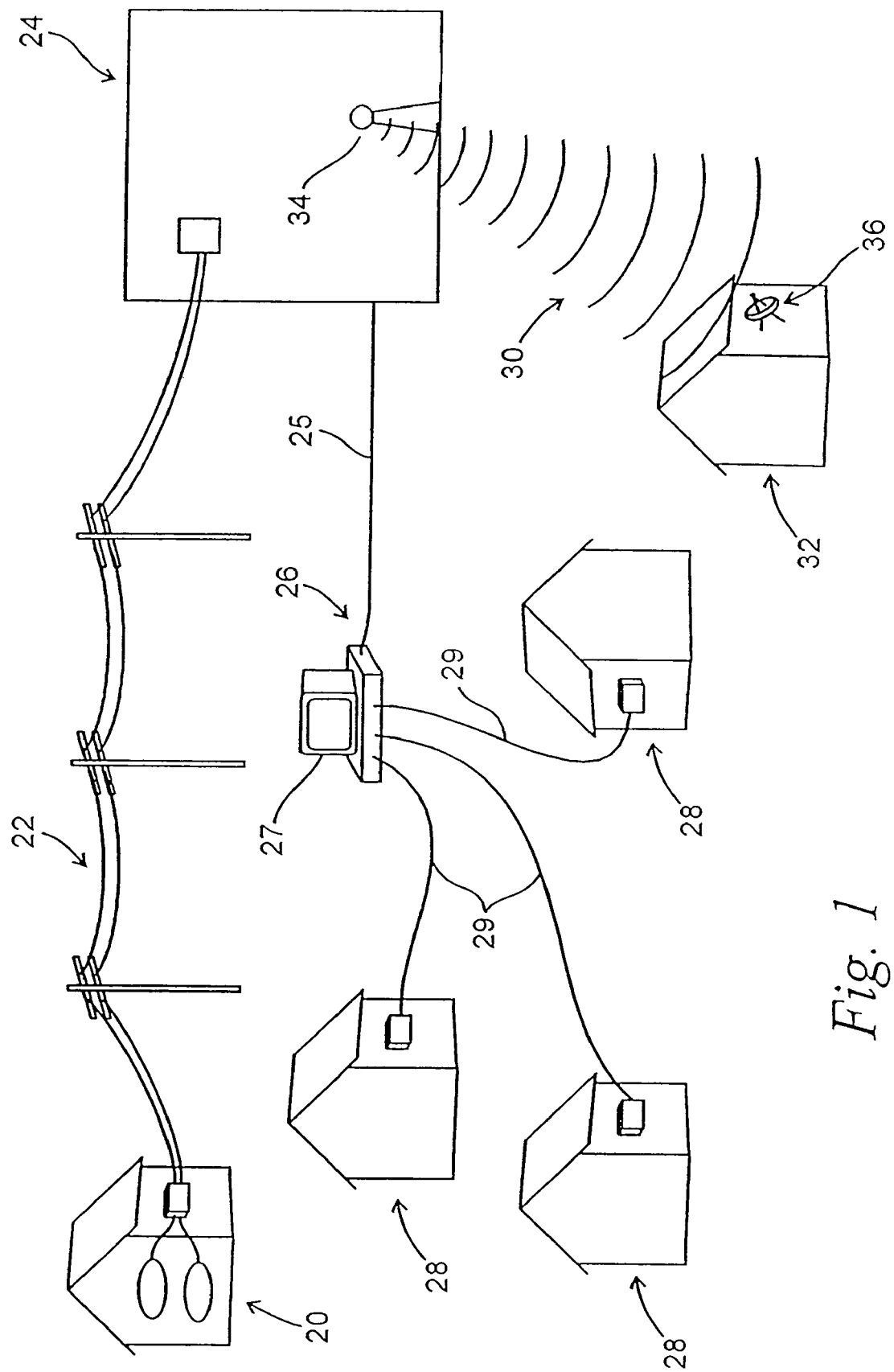
FIG. 1 shows a system diagram of the local loop between the customer premises and telephone service provider central office in accordance an aspect of the present invention.

As shown in FIG. 1, the subscriber location or customer premises 20 is in communication with the telephone service provider central office 24 using a local loop 22 carrying both POTS analog voice signals and high-speed digital data traffic between the customer premises 20 and the telephone service provider central office 24. The local loop 22 may take different forms but is typically a twisted pair of copper wires providing plain old telephone service ("POTS") or 1 measured business service to the customer location. The local loop 22 may also provide high-speed communication services such as integrated services digital network ("ISDN") or higher rate services such as Primary Rate Interface ("PRI") or 24 channel T1 service. In the present embodiment, the local loop preferably includes a high-speed digital subscriber line 26 ("DSL" or "XDSL") such as a high-speed digital subscriber loop ("HDSL"), asymmetric digital subscriber loop ("ASDL") or rate adaptive digital subscriber line ("RADSL"). Alternatively, a digital carrier system 26 provides digital data lines which enable subscribers 28 to transmit large amounts of digitally multiplexed data traffic over the POTS twisted pair telephone line 29. The remote terminal 27 combines a plurality of subscribers 28 onto a digital multiplexed data line 25 for transmission between the subscriber location 28 and the central office 24. For example, a 24-channel digital multiplexed T1 line is commonly used in North America for the multiplexed data line 25. T1 typically uses wire pairs using 16 to 24 gauge cable carrying data at the 1.544 Mbps DS1 line rate. In addition, fiber optic cable carrying a number of multiplexed channels of information may also be used in accordance with the present embodiment.

Preferably, ADSL is used to implement a subscriber loop with high-speed data capacity. ADSL implements a digital subscriber line 22 with asymmetric data rates between the customer premises and the central office, meaning the maximum available "downstream" data rate from the central office 24 to the subscriber location 20, 28 is greater than the maximum "upstream" data rate from the subscriber 20, 28 back to the central office 24. ADSL can provide data rates of up to 8 megabits-per-second ("Mbs") over 2 miles of twisted-pair wiring to provide a variety of digital data signals supporting computer, multimedia and video data, while providing POTS over the same line. A typical ADSL system provides a 1.5 Mbs rate from the central office 24 to the subscriber 20, 28 and about 640 kilobits-per-second ("Kbs") in the reverse direction from the subscriber location 20, 28 to the central office 24. ADSL may use discrete multi-tone ("DMT"), carrierless amplitude and phase ("CAP") or even quadrature amplitude modulation ("QAM") line coding. The American National Standards Institute's T1E1.4 committee has selected DMT as the ADSL standard.

Alternatively, the local loop may also include a wireless local loop (currently being deployed primarily in developing countries without existing communication infrastructure facilities and now available in the United States). The wireless local loop 30 provides communication from the central office 24 to the customer premises 32 without requiring new cable plant between the central office 24 and the customer premises 32. A wireless local loop 30 may use a transmitter 34 at the central office 24, transmitting microwave radio frequencies to a radio frequency receiver using an antenna 36 at the customer premises 32. The wireless local loop 30 can implement any of the ISDN, PRI, DSL, or high-capacity 24 channel T1 lines described above. In addition, fixed-satellite wireless communication systems allowing communication service to be directly received at the subscriber location from earth orbiting satellites are also available from companies such as Hughes Network Systems and Motorola Inc. Such systems are currently being deployed in developing countries.

The local loop, in its various forms 22, 26, 30, carries POTS and high-speed data signals between the subscriber locations 20, 28, 32 and the telephone service provider central office 24. POTS signals are typically analog voice band signals within the 200 Hz to 4 KHz frequency range. In comparison, high-speed digital data is usually carried at carrier frequencies several orders of magnitude higher than the voice band frequency range. For example, lower speed POTS signals may be carried in the 0 to 10 KHz frequency range, while ADSL carries high-speed data in the frequency range from 100 KHz up to 1 MHz or at even higher. Thus, POTS signals and high-speed data are carried over the same local loop facility at different frequencies.

Figure 2:
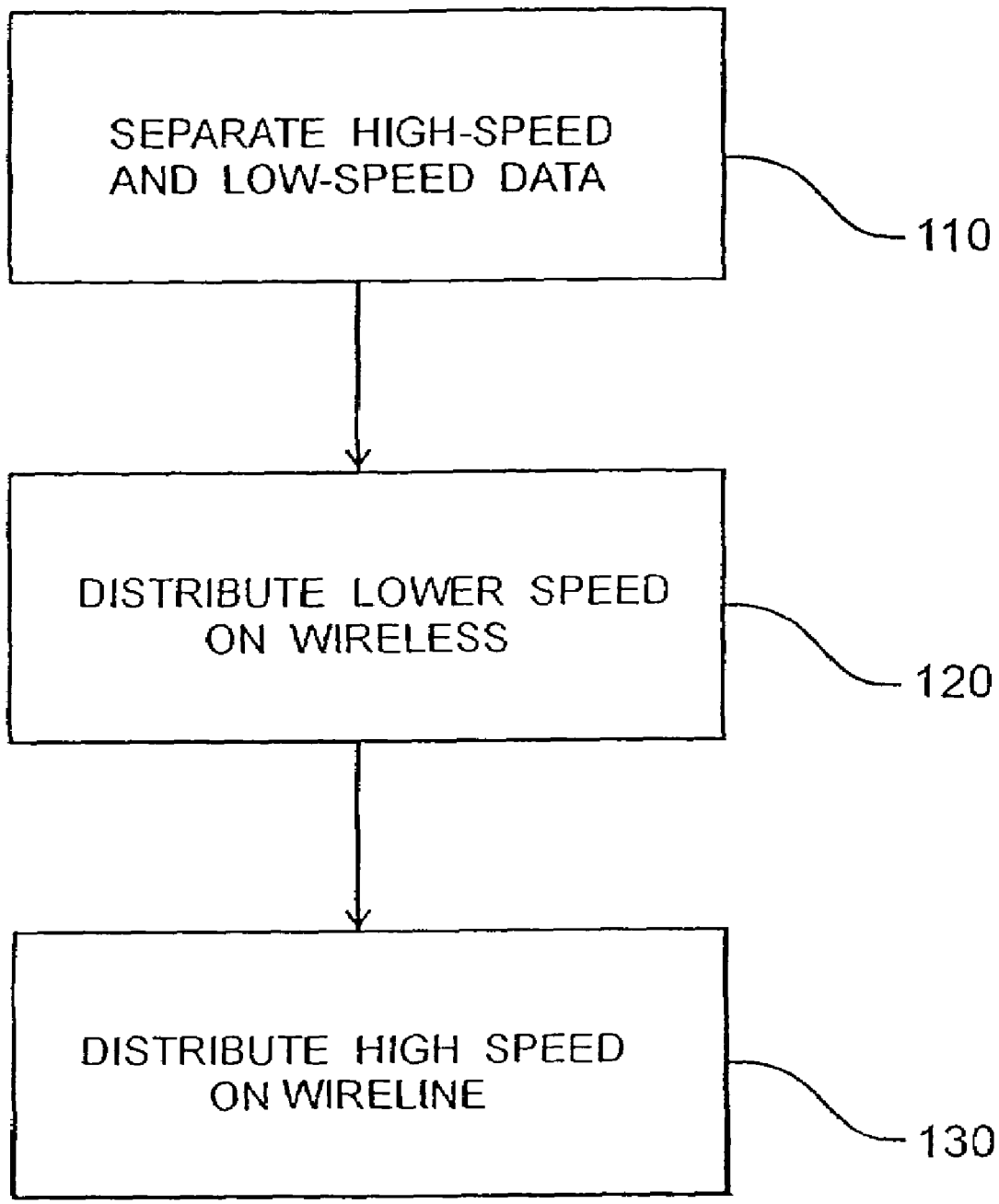
FIG. 2 shows a block diagram of the method according to an aspect of the present invention.

FIG. 2, summarizes the present method of implementing the described embodiment. At step 110, combined high-speed and lower speed POTS signals from the local loop is separated onto separate facilities. Preferably, the high-speed data is separated from the lower speed. POTS signals onto physically separate lines as described in connection with the description of the POTS splitter of FIG. 3. At step 120, the separated lower speed POTS signals are distributed over a wireless distribution system, rather than the conventional in-house POTS telephone wiring. At step 130, high-speed data is distributed over the existing wireline ordinarily used for distributing POTS within the customer premises. The details of the present method are further described below in connection with the present embodiment.

Figure 3:
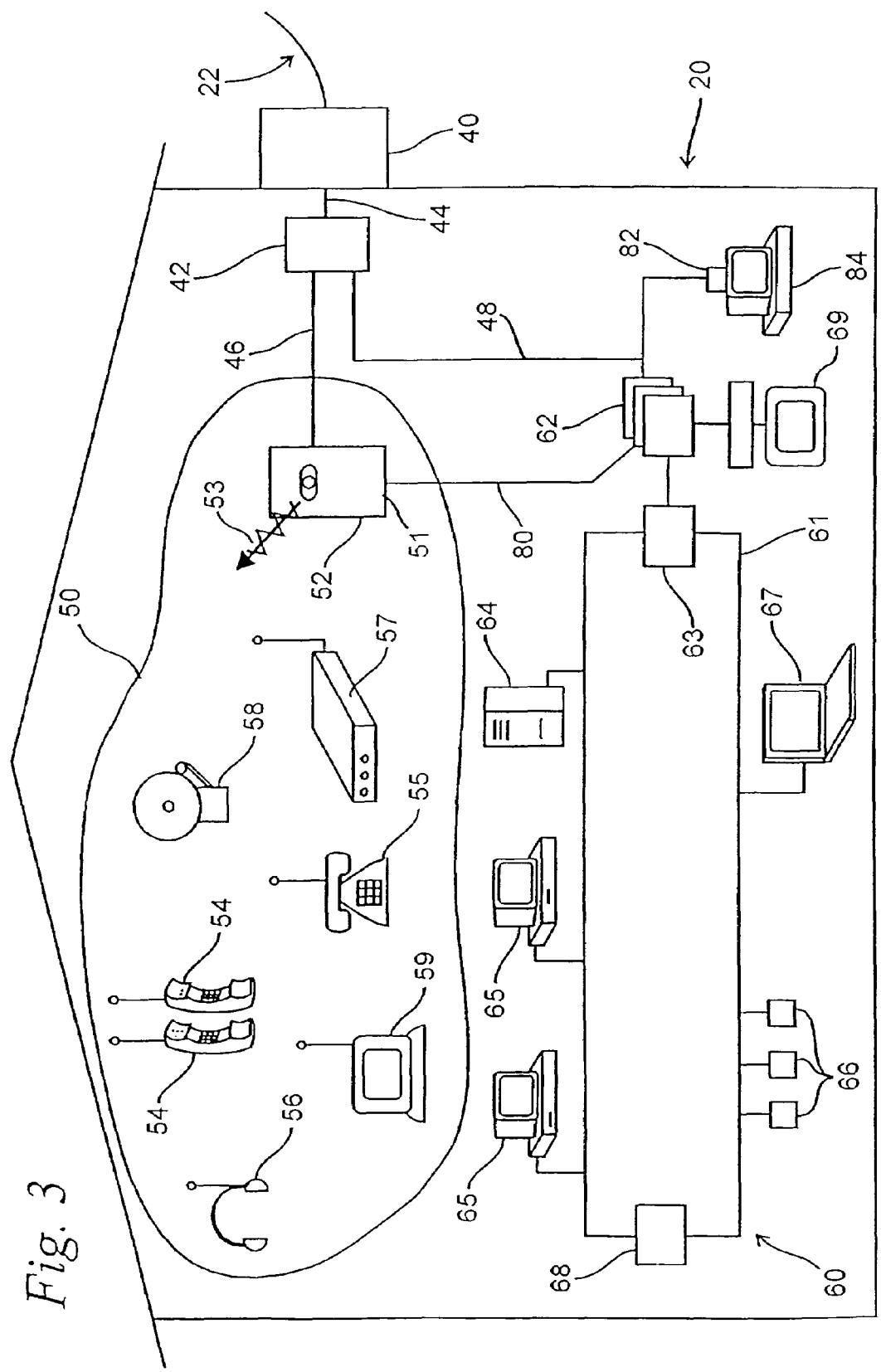
FIG. 3 shows a schematic diagram of the customer premises location of the system of FIG. 1.

FIG. 3 shows a diagram of a telephone subscriber location or customer premises 20 such as a typical home or small business office. The local loop 22 between the customer premises 20 and the central office 24 is terminated at the network interface device ("NID") 40 connecting the customer premises 20 to the public switched telephone network ("PSTN"). Typically, the NID 40 provides a common wiring point for the customer premises and the telephone service provider to connect and interface their equipment. The NID 40 serves as a convenient place to connect the local loop 22 to the customer premises 20 and demarcates customer premises equipment from telephone service provider equipment. In the preferred embodiment, on the customer premises side of the NID 40, a POTS splitter 42 is installed to separate high-speed data signals from lower speed POTS signals. Preferably, the POTS splitter 42 separates high-speed ADSL signals from lower speed POTS signals. The POTS splitter 42 has an input/output 44 from the local loop 22. The splitter 42 separates the high-speed data and the lower speed POTS signals into two separate outputs/inputs 46, 48 for distribution within the customer premises 20. One of the outputs/inputs 48 supplies high-speed data traffic and the other output/input 46 supplies POTS voice frequency signals. From the POTS splitter 44, the POTS voice frequency signals 46 are connected to the wireless distribution system 50 while high-speed data is connected to the wireline distribution network 60. Alternatively, the POTS splitter 42 may be provided internally within the NID 40.

Figure 4:
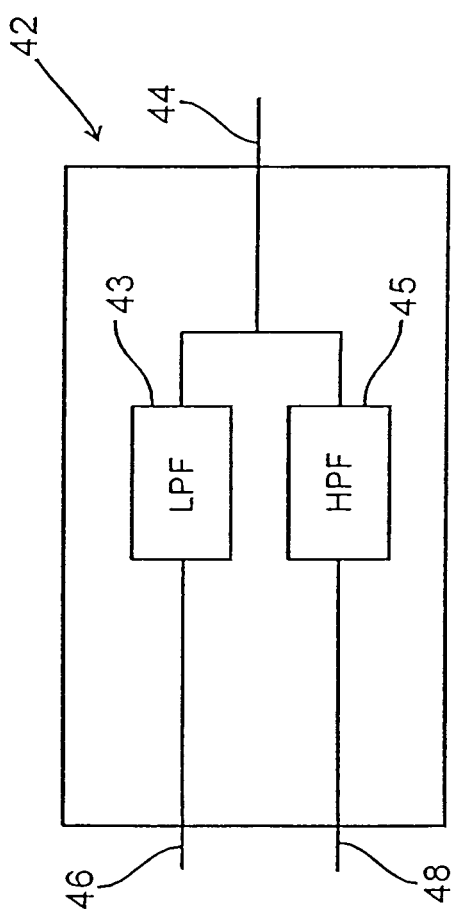
FIG. 4 shows a block diagram of the POTS splitter of the system of FIG. 1.

Now referring to FIG. 4, the operation of a POTS splitter 42 separating voice frequency signals from the data signals is described. Combined POTS and high-speed data signals carried by the local loop 22 to the customer premises are terminated at the input/output 44 of the POTS splitter 42 with an 600-800 ohm impedance. In the present embodiment, the POTS splitter 42 includes a high-pass filter 45 and a low-pass filter 43 to separate the different frequency signals. The high-pass filter 45 separates the high-speed data 48 to splitter output/input 48 and the low-pass filter 43 separates the lower speed POTS signals to output/input 46. To separate high-speed data, the high-pass filter 45 attenuates lower frequency signals and passes only higher frequency signals. The high-speed data signals are typically at higher signal frequencies, such as above 80 KHz. Thus, the high-pass filter 45 outputs only these high-speed data signals to output/input 48. To separate POTS voice signals, the low-pass filter 43 blocks high frequency signals, for example, signals above 10 KHz, passing only lower frequency voice band signals in the 200 Hz to 4 KHz range to the output/input 46. Thus, the high-pass 45 and low-pass 43 filters have separate outputs with the low-pass filter outputting POTS signals 46 and the high-pass filter outputting high-speed data traffic 48. It is to be understood that the POTS splitter 42 also operates in the reverse "upstream" direction to combine high-speed data 48 and lower speed signals 46 from the customer premises for transmission to the telephone service provider's central office 24. High-speed data destined for the central office 24 is input to the splitter 42 at output/input 48 and the lower speed data is input to the splitter at output/input 46. The high-speed data and the lower speed POTS signals are combined at input/output 44 for transmission to the central office 24. POTS splitters are available from suppliers of DSL telephone equipment such as NetSpeed of Austin, Tex.

The described embodiment of the POTS splitter is representative, and there are numerous other embodiments in accordance with the present invention. The described embodiment of the POTS splitter may be suitable for any of the local loop systems described in connection with FIG. 1 which combine high-speed and lower speed signals on the same local loop at different frequencies. The POTS splitter may also be implemented according to the requirements of the local loop. For example, a local loop that carries high-speed data and lower speed voice band frequencies on separate lines to the customer premises may eliminate the need for the POTS splitter altogether. Because the high-speed and lower speed signals are already carried on separate lines, there is no need for a POTS splitter to separate the signals onto separate lines. The high-speed data line can be directly fed to the wireline distribution network 60 and the lower speed signals can be directly fed to the wireless distribution system 50.

Referring again to FIG. 3, a diagram of the wireless distribution system 50 carrying POTS and lower speed data within the customer premises 20 is represented schematically. To provide access to the wireless distribution system 50, the low-pass output/input 46 of the POTS splitter 42 is connected to a wireless controller 52. The wireless controller 52 transmits the lower speed signal output of the POTS splitter 42 to the various remote receivers 54, 55, 56, 57, 58, 59 in the range of wireless distribution network 50. Preferably, the wireless controller 52 is located near the POTS splitter 42 to receive the lower speed data or POTS voice signals from the low-pass output/input 46 of the splitter. The wireless system 50 preferably carries voice telephone signals associated with POTS, but may also carry lower speed data such as that associated with a modem or other relatively low baud rate data systems. For example, an output 80 of the ADSL modem 62 may be supplied to the wireless controller 52 of the wireless distribution system 50. The wireless controller 52 may have a low-speed data input 51 that can receive a connection 80 from the wireline distribution system 60 using a conventional RJ-11 telephone jack. The wireless distribution system 50 can thus distribute a lower speed data channel from the wireline distribution system over one of its wireless channels. For example, the wireless controller 52 may provide a multiple number of 64 Kbs to 128 Kbs data channels. The wireless channels may carry a number of POTS lines but may also be used to carry a lower speed data channel from the ADSL modem 62. Thus, lower speed data from the ADSL modem 62 is also available for use by devices on the wireless distribution system 50.

The wireless controller 52 has a radio frequency ("RF") interface to communicate with the various remote receivers using a small antenna 53. The antenna 53 may be driven by a low power transmitter broadcasting with less than an 0.1 watt of power to provide wireless service with a range from a few feet to a few hundred feet of the wireless controller 52. Of course, higher power wireless distribution systems may transmit with greater power to provide greater usable range. The wireless controller 52 may use the household alternating current ("AC") electrical wiring (not shown) as a transmitting antenna. Such systems may use a capacitor to block the AC line current while passing a frequency modulated carrier with a center frequency ranging from 1.6 to 1.8 MHz through its AC power cord to the household electrical wiring. Smaller whip antennas (less than one meter in length) can also be used in accordance with this exemplary embodiment. The various remote receivers 54, 55, 56, 57, 58, 59 in the wireless distribution network 50 may also use similar whip antennas to transmit with low power.

The wireless distribution system 50 can take many different forms and have different RF interfaces as compatible with regulatory agencies as the Federal Communications Committee ("FCC") and applicable industry standard protocols. For example, a simple consumer cordless telephone system that provides a base unit transmitting and receiving at the 45 to 50 MHz frequency range to receivers such as a cordless, battery-powered telephone handset 54 can be used. Such cordless telephone systems provide full-duplex operation between the base station 45 and the handset 54 by transmitting at one frequency and receiving at second frequency. A typical cordless telephone system transmits signals at about a 46 MHz frequency and receives signals at around 49 MHz. Half-duplex wireless systems transmitting over a single frequency are less desirable for voice operation. In these wireless systems, the signals are typically analog signals modulated using amplitude modulation or frequency modulation techniques. Often a number of different channels at different frequencies in the 45 to 50 MHz range are made available for multiple channel capability for operation under noisy electrical conditions.

Most preferably, the wireless distribution system operates in the higher 800 to 900 MHz frequency band now being used in a variety of consumer wireless applications such as the latest generation of wireless telephones, pagers, and the like. The preferred system is a digital communication system having multiple channel capacity to provide a plurality of POTS lines and lower speed data channel(s). Multi-channel digital wireless systems using time-division multiple access ("TDMA"), frequency-division multiple access ("FDMA") and spread spectrum techniques such as code division multiple access ("CDMA") feature provide greater bandwidth capacity and may be less prone to interference in electrically noisy environments such as the typical business office. The remote receiver may be a wireless handset or a fixed-wireless telephone station 55, similar to a conventional style telephone, except using an antenna and transceiver rather than a wireline to receive signals. The fixed-wireless telephone station may use battery or AC power and provide the telephony functions of receiving, transmitting, DTMF generation/detection, on and off-hook detection and voice coding. Of course, all the features of conventional telephones such as wireless paging, intercom, speakerphone, security codes, volume controls, and the like may be incorporated. The wireless system may also have wireless headsets 56, wireless modems 57, or other home devices that are connected to receive lower data rate information, such as an alarm system 58.

In another example, a kitchen counter display device 59 with a liquid crystal display may use a channel of the wireless distribution system 50 to access a recipe page on the Internet via a modem connection. To find a recipe, a user may use the kitchen display device 59 to connect to a host computer containing recipes, such as a web page on the Internet, using a lower speed data connection over the wireless distribution system 50. Preferably, the wireless distribution system 50 provides a lower speed data connection that uses a lower speed data connection from the ADSL modem 62. A data connection on the ADSL modem 62 has the advantage over a conventional telephone modem in that the ADSL modem 62 always has a data connection without having to establish a new connection, i.e., a telephone call and connection does not have to be established for each call. Thus, a considerable amount of call setup time can be saved to allow quick access to information. It should be understood, of course, that a conventional facsimile, computer modems, wireless modems, paging systems, alarm systems and other lower speed data systems may also utilize the wireless distribution system.

Other wireless communication systems or mobile telephones operating at higher frequency ranges, such as the 1.5 GHz frequency range used by personal communication systems ("PCS"), are also suitable for the wireless distribution system in accordance with the present invention. A personal communication network ("PCN") may also implement a wireless telephone system from the telephone service provider central office that bypasses the local loop. PCN uses light, inexpensive handheld handsets and communicates via lower power antennas than cellular telephone systems, therefore having longer battery life. PCN systems typically operate in the 1850 MHz to 1990 MHz frequency range. The PCN implementation of the wireless distribution system simplifies the embodiment of the invention. Using the PCN system, voice telephony is carried from the telephone service provider's central office on a wireless distribution system, however, high-speed data traffic may still be carried from the telephone service provider on a DSL local loop. Because PCN carries the lower speed voice data separately from the high-speed data, the need for a POTS splitter may be eliminated. The high-speed data carried by the local loop from the telephone service provider central office is sent directly to the customer premises wiring for distribution on the wireline network. PSC and PCN systems may also provide a wireless private branch telephone exchange ("WPBX") providing telephony functions within or in close proximity to a customer premises location.

It should be understood that unlike typical home cordless telephone systems, which are used in conjunction with a standard telephone connected to the in-house telephone wiring, the present embodiment does not require use of the in-house wiring. The wireless controller 52 can be directly connected to the POTS splitter 42 and the lower speed data transmitted without being carried by the existing wireline system.

As described above, conventional POTS signals are separated by the POTS splitter 42 to be distributed on a wireless network 50 without using the existing telephone wiring. The existing telephone wiring 61 can thus be used to carry high-speed data. To implement the wireline distribution system 60, the high-speed data output/input 48 of the POTS splitter 42 is connected to the existing telephone wiring 61. For example, the tip and ring pair of the conventional telephone wiring 61 is used to distribute high-speed computer data such video, multimedia audio, graphics and text or computer data associated with a local area network. Once connected to the existing telephone wiring 61, the high-speed signal is available throughout the customer premises 20, wherever the telephone cabling 61 runs. Typically 4 wire or "quad" telephone cable is used for the telephone wiring in most homes. Preferably, the telephone wiring 61 is twisted pair 22 gauge copper wire, however, 18, 19, 24 or 26 gauge copper wire is also suitable for customer premises wiring. If necessary, a line boost amplifier 68 can also be used to amplify the signal for longer cable runs. It should also be understood that other types of shielded cable or coaxial cable are also suitable for the wireline system.

Still referring to FIG. 3, the wireline system 60 uses the existing telephone wiring 61 in the subscriber home, business or small office to distribute high-speed data throughout the customer premises 20. In one embodiment, the high-speed data output/input 48 of the POTS splitter is connected to the wireline distribution network via an ASDL modem to demodulate and decode the ADSL local loop. The ADSL modem 62 can also be provided on a network interface card ("NIC") 82 as a component of a personal computer 84. The personal computer 82 can then terminate the ADSL line and be used as a high-speed data connection in any room of the house where the wireline distribution system 60 is available. Alternatively, the ADSL modem 62 may also be a standalone device providing outputs connected to other computer devices or a network switch, router 63, or network server 64 providing access to local area network of computers 65, peripherals, or video display devices 69. The ADSL modem 62 may have a number of different outputs, such as an output 80 connected to the wireless controller 52. It should be understood that the video display device 69 may require an appropriate interface device to the ADSL modem, typically in the form of a set-top box.

Using the existing wireline 61, high-speed digital data services can be delivered to multiple access points 66 throughout the home 20 for a laptop computer 67 or other customer applications. Most new and existing buildings presently have either 2 wire or 4 wire telephone cabling to each area of the building. The wiring is typically terminated to a modular RJ-11 type jack in each room of the building where access to telephone service was provided. The computer devices 65 preferably interface the wirelines using a NIC of the appropriate network protocol type for accessing the incoming data. For example, if the data carried on the wireline 61 implements the Ethernet protocol the NIC implements an Ethernet Interface. If the data carried on the wireline distribution network uses the asynchronous transfer mode ("ATM") protocol, the NIC implements an ATM interface. The conventional RJ-11 jacks can be adapted to an appropriate network interface jack for computer network devices and NICs.

Figure 5:
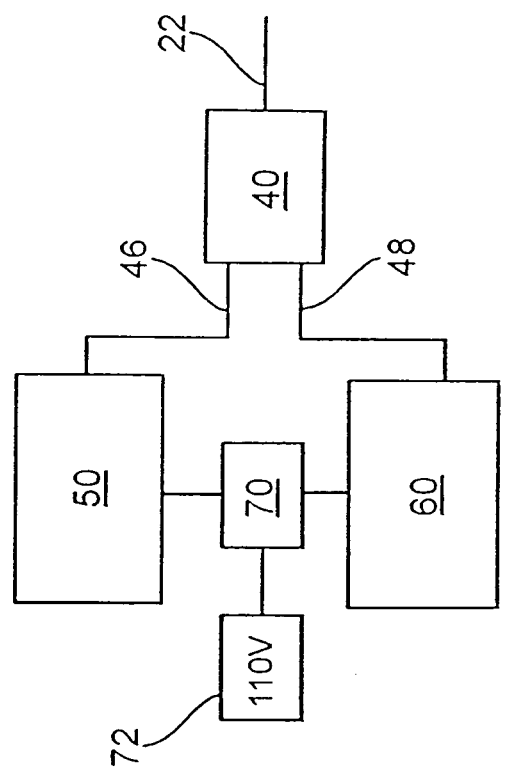
FIG. 5 shows a block diagram of the backup power feature in accordance with another aspect of the present invention.

Referring now to FIG. 5, in another aspect of the present invention a means for providing POTS telephone service during a power outage is described. The wireless controller 52 operates on AC power supplied by the local power company. During an AC power outage, power to the wireless controller 52 is lost, rendering the wireless distribution system 50 inoperable. Thus, POTS over the wireless distribution system 50 is lost during a power outage. The telephone service provider central office, however, typically has its own uninterruptible power source such as the central office batteries that supplies power for POTS during power outages. In the present embodiment, a switch 70 is provided to make POTS available over the wireline distribution system 60 during power outages. For example, switch 70 is connected between the input of the wireless distribution system 50 and the wireline distribution network 60. The switch 70 is also plugged into the conventional 120 volt AC power supply line 72 to detect the presence or absence of AC power. Under normal operating conditions, when AC power is available, the switch 70 is normally open and has no effect on the operation of the system. When the switch 70 detects the loss of AC power 72, the switch closes, channeling POTS from the input of the wireless distribution network 50 to the wireline distribution network 60. Thus, POTS is available on the wireline distribution network when AC power is lost. Conventional combinational logic, well known to those skilled in the art, may be used to detect the loss of power and control the operation of the switch 70. When power 72 is restored, the switch is programmed to open again. As readily apparent, other systems of maintaining power during power outages such as an uninterruptable power supply may also be utilized.

The present embodiment of the invention uses the POTS splitter to separate high-speed data, such as computer data, from lower speed signals, including telephony voice signals. The lower speed signals are directed to a wireless distribution system to transmit the lower speed signals to various devices throughout the customer premises using radio frequencies. The higher-speed data is directed to the wireline distribution network for distribution throughout the customer premises on the telephone wiring ordinarily used to carry voice telephony. Using the present embodiment allows separate voice and data line to be supplied to customers without the cost and disruption of installing additional cable facilities. The wireless system is used for distributing lower speed POTS signals, reducing the complexity and cost of the wireless system. The wireline system, which ordinarily has higher bandwidth, is used for distributing high-speed data.

The present disclosure has many different uses and applications. For example, the present disclosure may be used in conjunction with the derived digital telephone line service ("Powerline Phone") discussed in application Ser. No. 09/533,263 by W. Walkoe and J. Barber, which is assigned to the assignee of this present application and hereby incorporated by reference. Derived digital telephone line service recognizes the desirability of providing a plurality of POTS lines along with a DSL service, such as ADSL, to the customer premises. A conventional analog POTS line and ADSL service is ordinarily provided to the customer premises. To provide additional POTS lines, an ADSL channel is used to implement digital POTS lines carrying POTS voice traffic. The digital POTS lines are similar to conventional POTS lines except that they are implemented and carried over the ADSL. In conjunction with the present disclosure, the wireless distribution system may be used to carry the conventional POTS line for mobile network carries high-speed digital data traffic and the derived digital voice lines implemented over the ADSL. Additionally, the wireless distribution system may also carry a number of derived digital POTS lines over its plurality of wireless channels. Thus, the wireless/wireline distribution system may be used to carry a plurality of POTS lines along with a DSL service.

It is to be understood that both the foregoing general description and the following detailed description are exemplary and explanatory and are intended to provide further explanation of the invention as claimed. Numerous modifications and variations are possible. It is intended that the foregoing detailed description be regarded as illustrative rather than limiting. It is the following claims, including all equivalents, which are intended to define the scope of this invention.

I claim:

1. A system for providing access to a higher data transmission rate channel and a lower data transmission rate channel present on a communications trunk, the system comprising:
   an integral transmission line integrated into a premises served by the communications trunk;
   a digital wireless distribution system for communicating the lower data transmission rate channel at the premises, the digital wireless distribution system configured with a multiple channel format;
   a splitter associated with a termination of the communications trunk, the splitter configured to separate the higher data transmission rate channel for transmission over the integral transmission line and the lower data transmission rate channel for transmission over the digital wireless distribution system; and
   an alarm system in communication with the lower data transmission rate channel.

2. The system of claim 1 further comprising a switch in communication with the digital wireless communication system and the integral transmission line, wherein the switch provides the lower data transmission rate channel on the integral transmission line upon the detection of a power outage.

3. The system of claim 2 wherein the switch is connected to an alternating current power supply of the premises to detect a loss of power at the premises and provides lower data transmission rate channel on the integral transmission line.

4. A system for providing access to a higher data transmission rate channel and a lower data transmission rate channel present on a communications trunk, the system comprising:
   an integral transmission line integrated into a premises served by the communications trunk;
   a digital wireless distribution system for communicating the lower data transmission rate channel at the premises, the digital wireless distribution system comprising a wireless controller wherein the wireless controller is configured to utilize alternating current wiring at the premises as a transmitting antenna;
   a splitter associated with a termination of the communications trunk, the splitter configured to separate the higher data transmission rate channel for transmission over the integral transmission line and the lower data transmission rate channel for transmission over the digital wireless distribution system; and
   an alarm system in communication with the lower data transmission rate channel.

5. The system of claim 4 further comprising a switch in communication with the digital wireless communication system and the integral transmission line, wherein the switch provides the lower data transmission rate channel on the integral transmission line upon the detection of a power outage.

6. The system of claim 5 wherein the switch is connected to an alternating current power supply of the premises to detect a loss of power at the premises and provides lower data transmission rate channel on the integral transmission line.

7. A system for providing access to a higher data transmission rate channel and a lower data transmission rate channel present on a communications trunk, the system comprising:

means for transporting a signal to a customer premises, the signal comprising the higher data transmission rate channel and the lower data transmission rate channel;

means for separating the signal into the higher data transmission rate channel and the lower data transmission rate channel;

wireless distribution means for communicating the lower data transmission rate channel within the customer premises; and wireline distribution means for communicating the higher data transmission rate channel within the customer premises, wherein the lower data transmission signal is not carried by the wireline distribution means, and wherein the wireless distribution means comprises a wireless controller wherein the wireless controller is configured to utilize alternating current wiring at the premises as a transmitting antenna.

* * * * *